(12) United States Patent
Caceres et al.

(10) Patent No.: US 10,498,754 B2
(45) Date of Patent: Dec. 3, 2019

(54) SYSTEMS AND METHODS FOR POLICING AND PROTECTING NETWORKS FROM ATTACKS

(71) Applicant: Verizon Patent and Licensing Inc., Arlington, VA (US)

(72) Inventors: Manuel Enrique Caceres, Basking Ridge, NJ (US); Warren Hojilla Uy, Randolph, NJ (US); Young R. Choi, Belle Mead, NJ (US); Mauricio Pati Caldeira de Andrada, South Plainfield, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 196 days.

(21) Appl. No.: 15/618,451

(22) Filed: Jun. 9, 2017

(65) Prior Publication Data

US 2018/0359269 A1 Dec. 13, 2018

(51) Int. Cl.
| | | |
|---|---|---|
| *G06F 11/00* | (2006.01) | |
| *H04L 29/06* | (2006.01) | |
| *H04L 12/46* | (2006.01) | |
| *G06F 12/14* | (2006.01) | |
| *H04L 29/08* | (2006.01) | |
| *H04W 4/70* | (2018.01) | |

(52) U.S. Cl.
CPC ...... *H04L 63/1425* (2013.01); *H04L 12/4641* (2013.01); *H04L 63/102* (2013.01); *H04L 63/1458* (2013.01); *H04L 63/0236* (2013.01); *H04L 63/0245* (2013.01); *H04L 67/303* (2013.01); *H04W 4/70* (2018.02)

(58) Field of Classification Search
CPC . H04L 47/22; H04L 63/0227; H04L 63/1425; H04L 43/04; H04L 63/02; H04L 63/0428; H04L 67/22
USPC .............................. 726/3, 11, 23; 455/1, 410
See application file for complete search history.

(56) References Cited

U.S. PATENT DOCUMENTS

| | | | | |
|---|---|---|---|---|
| 9,154,516 B1* | 10/2015 | Vaystikh | ............. | H04L 63/1425 |
| 9,544,798 B1* | 1/2017 | Ahmadzadeh | ........ | H04W 24/08 |
| 9,641,544 B1* | 5/2017 | Treat | ................... | H04L 63/1425 |
| 9,762,610 B1* | 9/2017 | Kwan | ................. | H04L 63/1458 |
| 2002/0157020 A1* | 10/2002 | Royer | ................. | H04L 63/1425 726/11 |
| 2006/0276173 A1* | 12/2006 | Srey | ...................... | H04W 12/08 455/410 |
| 2007/0204338 A1* | 8/2007 | Aiello | ..................... | H04L 43/16 726/11 |
| 2010/0054451 A1* | 3/2010 | Townsend | ............. | H04M 3/436 379/265.09 |

(Continued)

*Primary Examiner* — Gary S Gracia

(57) ABSTRACT

A method may include monitoring communications from a first user device coupled to a network and determining, based on the communications, whether the first user device is operating in accordance with a profile associated with the first user device. The method may also include transmitting a message to a network device in response to determining that the first user device is not operating in accordance with the profile. The method may further include blocking at least some communications from being transmitted to or received by the first user device, in response to determining that the first user device is not operating in accordance with the profile.

20 Claims, 8 Drawing Sheets

(56) References Cited

U.S. PATENT DOCUMENTS

| | | | |
|---|---|---|---|
| 2011/0319010 A1* | 12/2011 | Nelkenbaum | H04W 12/12 455/1 |
| 2014/0137186 A1* | 5/2014 | Greenlee | G06F 21/60 726/3 |
| 2014/0282845 A1* | 9/2014 | Dunne | H04L 63/20 726/1 |
| 2015/0215832 A1* | 7/2015 | Fitzpatrick | H04W 48/18 455/426.1 |
| 2016/0036764 A1* | 2/2016 | Dong | H04L 61/3025 370/254 |
| 2017/0237815 A1* | 8/2017 | Arsenault | H04W 4/70 709/217 |

\* cited by examiner

SYSTEMS AND METHODS FOR POLICING AND PROTECTING NETWORKS FROM ATTACKS

BACKGROUND INFORMATION

The number of devices connected to the Internet continues to rise. For example, home and enterprise local area networks (LANs) often include a number of devices, such as personal computers, laptops, printers, cellular devices, tablets, etc., that are connected to the Internet via their respective LANs. In addition, new types of devices, such as Internet of Things (IoT) devices, are increasingly being added to networks. As a result of the increased number of devices connected to the Internet, the number and sophistication of network attacks, such as Distributed Denial of Service (DDoS) attacks, have increased. Therefore, networks and networked devices have become increasingly vulnerable to attacks.

DETAILED DESCRIPTION OF PREFERRED EMBODIMENTS

Figure 1:
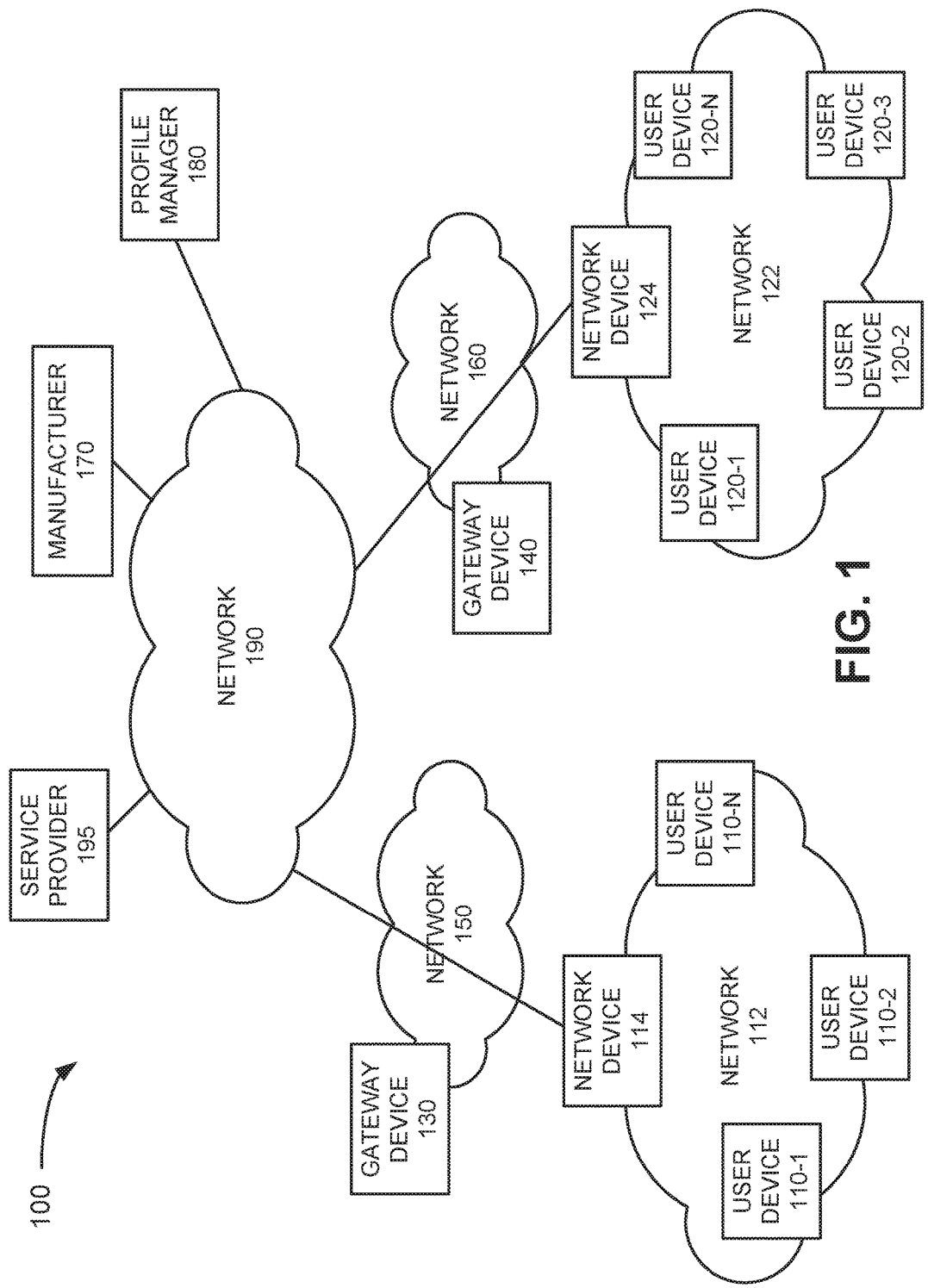
FIG. 1 illustrates an exemplary environment in which systems, devices and methods described herein may be implemented.

The following detailed description refers to the accompanying drawings. The same reference numbers in different drawings may identify the same or similar elements. Also, the following detailed description does not limit the invention.

Implementations described herein relate to monitoring and policing networks for suspicious activity. In an exemplary implementation, devices included in networks are expected to behave in accordance with a governance structure. For example, in one implementation, a network governance structure includes device profiles or "fingerprints" for network devices. Each device profile provides service characteristics that identify the manner in which the particular device is expected to operate, such as the type of communications that the device is expected to transmit and receive, devices with which the particular device is expected/authorized to communicate, the data or payload size associated with typical communications, a frequency of communications, etc.

Various other devices in the network (e.g., a gateway or router device) may then act to self-police the network by enforcing the device profiles, without the need for human intervention or monitoring. For example, in situations in which a device is not operating in accordance with its profile, another network device (e.g., a peer device, a router, a gateway, a service provider, etc.) may report suspicious activity associated with the operating behavior of the device. The suspicious activity may be reported to a gateway or router located closest to the suspicious device, to an Internet service provider (ISP) providing Internet access to the suspicious device, etc. The gateway/router, ISP or other network device receiving the indication of suspicious activity may then limit or prohibit at least some communications from being transmitted by or received by the suspicious device. In some implementations, a gateway or other network device may place an offending or suspicious device that is not operating in accordance with its profile in a virtual local area network (VLAN) in which its operations may be more easily monitored and controlled.

In this manner, a self-policing network governance structure allows for real time or near real time monitoring of device behavior and dynamically enforcing policies or actions on devices that have potentially been compromised with malware or other harmful software/hardware, and/or may be involved in a network attack. This monitoring and enforcement of network policies allows for quicker responses to network attacks, thereby reducing the likelihood that such attacks will be successful. In addition, by proactively monitoring the behavior of network devices, networks and/or network administrators may more quickly determine that various devices may have been compromised, thereby allowing networks, to rectify the potential problems and allow the network devices to resume normal operations. Still further, self-policing of network devices may allow manufacturers and/or service providers associated with various devices to become aware of potential malware issues or vulnerabilities of their devices more quickly. This may allow the manufacturers to proactively fix the problems (e.g., download software patches) before the malware, virus, etc., infects thousands of other devices and/or causes the compromised devices to be involved in network attacks, thereby further enhancing network security.

FIG. 1 is a block diagram of an exemplary environment 100 in which systems and methods described herein may be implemented. Environment 100 may include user devices 110-1 through 110-N, user devices 120-1 through 120-N, network devices 114 and 124, gateway devices 130 and 140, networks 150, 160 and 190, manufacturer 170, profile manager 180 and service provider 195.

User devices 110-1 through 110-N (referred to individually as user device 110-x or 110 and collectively as user devices 110) and user devices 120-1 through 120-N (referred to individually as user device 120-x or 120 and collectively as user devices 120) may each include a mobile device, such as wireless or cellular telephone device (e.g., a conventional cell phone with data processing capabilities), a smart phone, a personal digital assistant (PDA) that can include a radiotelephone, etc. User devices 110/120 may also include any type of computer device or system, such as a personal computer (PC), a laptop, a tablet computer, a notebook, a netbook, a wearable computer (e.g., a wrist watch, eyeglasses, etc.), a printer, an email server, a game playing device, a music playing device, a television, a home appliance device, a home monitoring device, a camera, etc. User devices 110/120 may further include Internet of Things (IoT) devices or "smart" devices, such as sensors, actuators, home automation devices, etc., that may include communication functionality. For example, IoT devices may include machine type communication (MTC) devices that communicate wirelessly with other devices over a machine-to-machine (M2M) interface.

User devices 110 may be part of a local area network (LAN) or wide area network (WAN), such as network 112 which may be a home LAN associated with a customer premises or home. User devices 120 may similarly be part of a LAN or WAN, such as network 122 which may be a LAN or WAN associated with a business, corporation, educational institution, etc. User devices 110 may connect to network 112 and other devices in environment 100 (e.g., network device 114, gateway device 130, networks 150 and 190, etc.), and user devices 120 may connect to network 122 and other devices in environment 100 (e.g., network device 124, gateway device 140, networks 160 and 190, etc.) via any conventional technique, such as wired, wireless, optical connections or a combination of these techniques. User device 110 and user device 120 and the person associated with user device 110 or user device 120 (e.g., the party holding or using user device 110 or 120, the owner of user device 110 or 120) may be referred to collectively as user device 110 or user device 120, respectively, in the description below.

Network device 114 may correspond to a broadband home router or other routing device that acts as a gateway for devices connected via network 112 to communicate with external networks, such as network 150 and/or 190. Similarly, network device 124 may correspond to a local broadband router or other routing device that acts as a gateway for devices connected via network 122 to communicate with external networks, such as network 160 and/or 190.

Network device 114 may act as a hub for communications to/from the customer's premises via network 112. For example, network 150 may be associated with an Internet service provider (ISP) that provides Internet access to user devices 110 connected to a customer's home LAN (e.g., network 112). In this case, network device 114 acts as a local router to route communications from user devices 110 to their appropriate destinations via network 150 and/or 190 and receive communications from network 150 and/or 190 and route the communications to the appropriate user device 110. Network device 124 may function in a similar manner as network device 114. That is, network device 124 may act as a hub for communications to/from network 122

As described above, network 112 may be a LAN or WAN associated with a customer's home and network 122 may be a LAN or WAN associated with a business, corporation, educational institution, etc. User devices 110 and user devices 120 may communicate via networks 112 and 122 via wired, wireless and/or optical connections.

Gateway device 130 may include one or more computing devices that act as a gateway for communications from network 112 to networks 150 and 190 and vice versa. Similarly, gateway device 140 may act as a gateway for communications from network 122 to networks 160 and 190. In one implementation, gateway device 130 may be associated with an ISP that provides Internet access to user devices 110 via networks 150 and 190. Similarly, gateway device 140 may be associated with a different ISP (e.g., a corporate ISP) that provides Internet access to devices in network 122 via networks 160 and 190.

Networks 150, 160 and 190 may each include one or more wired, wireless and/or optical networks that are capable of receiving and transmitting data, voice and/or video signals. For example, as described above, network 150 may be associated with an ISP that provides Internet access to use devices 110 connected via network 112. In one implementation, networks 150, 160 and 190 may include one or more public switched telephone networks (PSTNs) or other type of switched network. Networks 150, 160 and 190 may also include one or more wireless networks and may include a number of transmission towers for receiving wireless signals and forwarding the wireless signals toward the intended destination. Networks 150, 160 and 190 may further include one or more satellite networks, one or more packet switched networks, such as an Internet protocol (IP) based network, a LAN, a WAN, a personal area network (PAN), a WiFi network, a Bluetooth network, an intranet, the Internet, or another type of network that is capable of transmitting data. Network 150, 160 and/or 190 provide wireless packet-switched services and wireless Internet protocol (IP) connectivity to user devices 110 and 120 to provide, for example, data, voice, and/or multimedia services.

Manufacturer 170 may include one or more computing devices associated with a manufacturer of various devices, such as one or more of user devices 110 and/or 120. In one implementation, manufacturer 170 may generate "fingerprints" or profiles associated with the manufactured devices. These profiles may define the expected uses of user devices 110 and/or 120. For example, if manufacturer 170 makes Internet-connected thermostats that are controllable over a network, the profile for a thermostat may identify the host/server device to which the thermostat is expected to communicate, the types of communications, etc. As another example, if manufacturer 170 makes On-board diagnostic (OBD) devices for monitoring vehicle operations, the profile may identify the server/system to which it reports vehicle diagnostic information as being the only destination to which the OBD device is able to communicate. These profiles may then be used to monitor device behavior when user devices 110 and/or 120 are operational in environment 100, as discussed in more detail below.

Profile manager 180 may include one or more computing devices that store profiles of devices in environment 100. For example, profile manager 180 may store device profiles generated by manufacturer 170 for user devices 110 and 120. Profile manager 180 may then provide the device profiles to requesting devices in environment 100, such as network devices 114 and 124 or other devices in environment 100, as described in more detail below.

Service provider 195 may include one or more computing devices or systems that provide services in environment 100. For example, service provider 195 may be associated with managing IoT devices in environment 100, such as thermostats, sensors associated with appliances, etc., as described in more detail below. Service provider 195 may also represent a service that user devices 110 and/or 120 communicate with to obtain information, such as a search engine, news cite, consumer site for purchasing goods/services, etc. In this case, service provider 195 may be the target of network attacks.

The exemplary configuration illustrated in FIG. 1 is provided for simplicity. It should be understood that a typical environment may include more or fewer devices than illustrated in FIG. 1. For example, environment 100 may include a large number (hundreds or more) of user devices 110 and 120, networks 112 and 122, network devices 114 and 124, gateway devices 130 and 140, networks 150, 160 and 190, profile managers 180 and service providers 195. In addition, environment 100 may include additional elements, such as eNodeBs, base stations, switches, gateways, routers, monitoring devices, etc., that aid in routing data/communications to user devices 110 and 120.

Various functions are described below as being performed by particular components in environment 100. In other implementations, various functions described as being performed by one device may be performed by another device or multiple other devices, and/or various functions described as being performed by multiple devices may be combined and performed by a single device. In addition, although networks 150, 160 and 190 are shown as separate networks, in other implementations, these networks or portions of these networks may be included in a single network.

Figure 2:
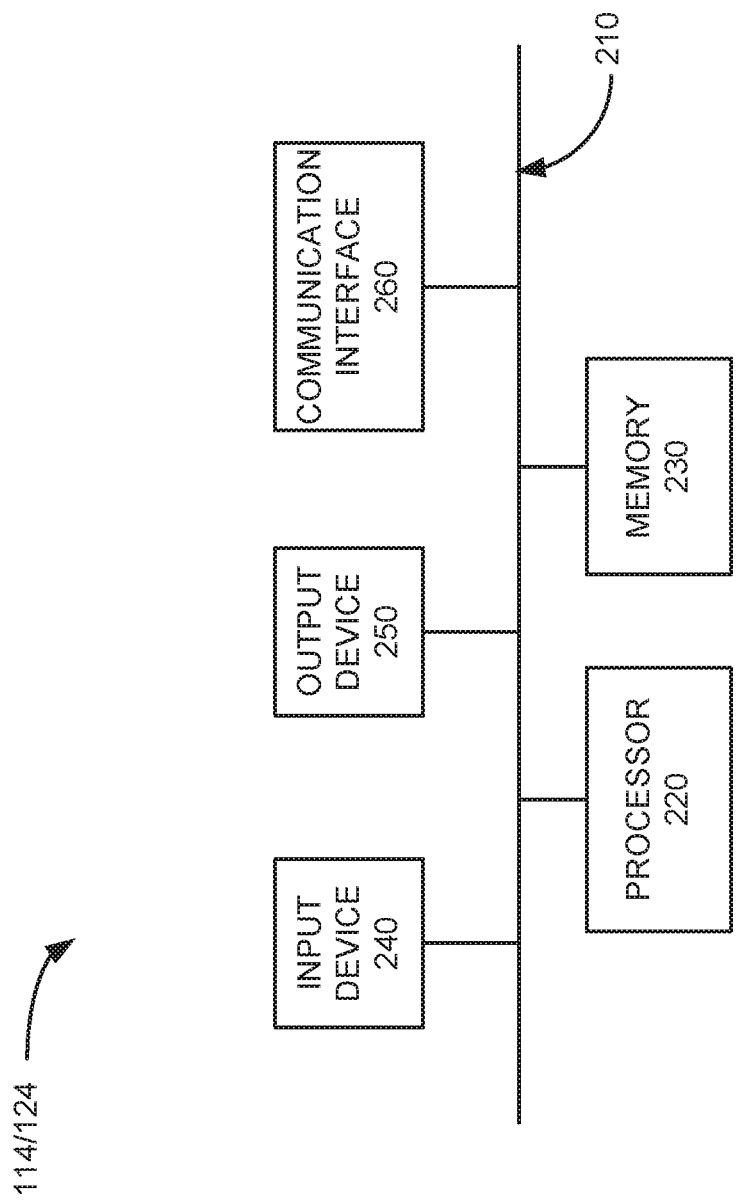
FIG. 2 illustrates an exemplary configuration of components implemented in one or more of the components of FIG. 1.

FIG. 2 illustrates an exemplary configuration of network devices 114 and/or 124. Other devices in environment 100, such as user devices 110, user devices 120, gateway devices 130 and 140, manufacturer 170, profile manager 180 and service provider 195 may be configured in a similar manner. Referring to FIG. 2, network device 114/124 may include bus 210, processor 220, memory 230, input device 240, output device 250 and communication interface 260. Bus 210 may include a path that permits communication among the elements of network device 114/124.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that network device 114/124 (or other components in FIG. 1) uses to communicate with other devices via wired, wireless or optical mechanisms. For example, communication interface 260 may include one or more radio frequency (RF) transmitters, receivers and/or transceivers and one or more antennas for transmitting and receiving RF data via network 112/122, 150/160 and/or 190. Communication interface 260 may also include a modem or an Ethernet interface to a LAN or other mechanisms for communicating with elements in a network, such as network 112/122 or another network.

The exemplary configuration illustrated in FIG. 2 is provided for simplicity. It should be understood that network device 114 or 124 (or user devices 110, user devices 120, gateway devices 130 and 140, manufacturer 170, profile manager 180 and service provider 195) may include more or fewer devices than illustrated in FIG. 2. In an exemplary implementation, network device 114/124 (or other device in environment 100) performs operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
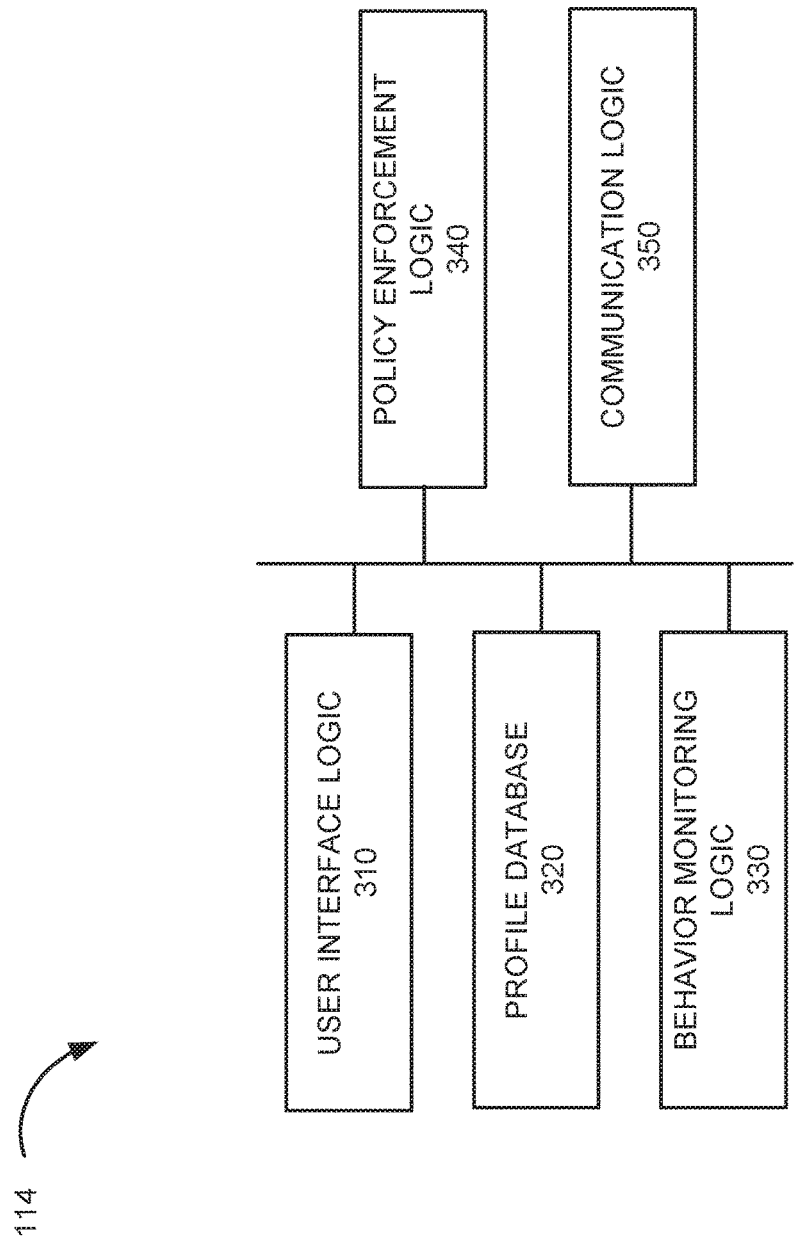
FIG. 3 illustrates an exemplary configuration of logic components included in one or more of the components of FIG. 1.

FIG. 3 is an exemplary functional block diagram of components implemented in network device 114. Network device 124 may be configured in a similar manner. In an exemplary implementation, all or some of the components illustrated in FIG. 3 may be implemented by processor 220 executing software instructions stored in memory 230.

Network device 114 includes user interface logic 310, profile database 320, behavior monitoring logic 330, policy enforcement logic 340 and communication logic 350. In alternative implementations, these components or a portion of these components may be located externally with respect to network device 114.

User interface logic 310 may include logic to allow a user (e.g., a network administrator, a home owner, etc.) to input information to network device 114 regarding operation of network 112. For example, a home LAN owner may input information regarding his/her connected user devices 110, information regarding a new user device 110 to be added to network 112, whether any user devices 110 have priority with respect to bandwidth usage, restrictions regarding use of particular user devices 110 (e.g., time or content based parental restrictions, company restrictions regarding types of content/web sites that may be accessed), etc.

Profile database 320 may store profile information associated with each of user devices 110. For example, user device 114 may receive profile information from other devices in environment 100, such as profile manager 180, manufacturer 170, service provider 195, etc., and store the information in profile database 320. Profiles stored in profile database 320 may be used to monitor the behavior of user devices 110, as described in detail below.

Behavior monitoring logic 330 may include logic to identify behavior associated with the functioning of user devices 110. For example, behavior monitoring logic 330 may monitor each user device 110 and compare the behavior (e.g., communications sent from/to each user device 110) to profile information for each user device 110 stored in profile database 320. In this manner, behavior monitoring logic 330 may determine whether one or more of user devices 110 are operating outside its normal operating parameters. In such cases, behavior monitoring logic 330 may determine that user device 110 is "suspicious." The term "suspicious" as used herein should be construed to indicate that the particular device is operating outside of its expected parameters and has potentially been affected by malware or other malicious hardware/software, has had its operations/functions taken over by an external entity or virus, or has potentially been compromised in any way and may be involved in a network attack or attempting to obtain confidential information (e.g., credit card information, a user's private information, a company's private information, etc).

Policy enforcement logic 340 may include logic to enforce network policies. For example, policy enforcement logic 340 may limit communications associated with one or more user devices 110 based on information received from behavior monitoring logic 330 indicating that a particular user device 110 is behaving in a suspicious manner. In this case, policy enforcement logic 340 may enforce communication-related restrictions with respect to operations of user device 110. In one implementation, if a particular user device 110 is considered suspicious, such as compromised with malicious hardware and/or software, policy enforcement logic 340 may place the particular user device 110 in a virtual local area network (VLAN) for further monitoring, as described in detail below.

Communication logic 350 may include logic to transmit and receive information to/from other devices in environment 100. For example, communication logic 350 may receive profile information for user devices 110 from profile manager 180 or other devices in environment 100. Communication logic 350 may also transmit messages/alerts regarding suspicious activity and/or restriction information regarding one or more user devices 110 to other devices in environment 100, as described in more detail below.

Although FIG. 3 shows exemplary components of network device 114, in other implementations, network device 114 may include fewer components, different components, differently arranged components, or additional components than depicted in FIG. 3. In addition, functions described as being performed by one of the components in FIG. 3 may alternatively be performed by another one or more of the components of network device 114.

Figure 4:
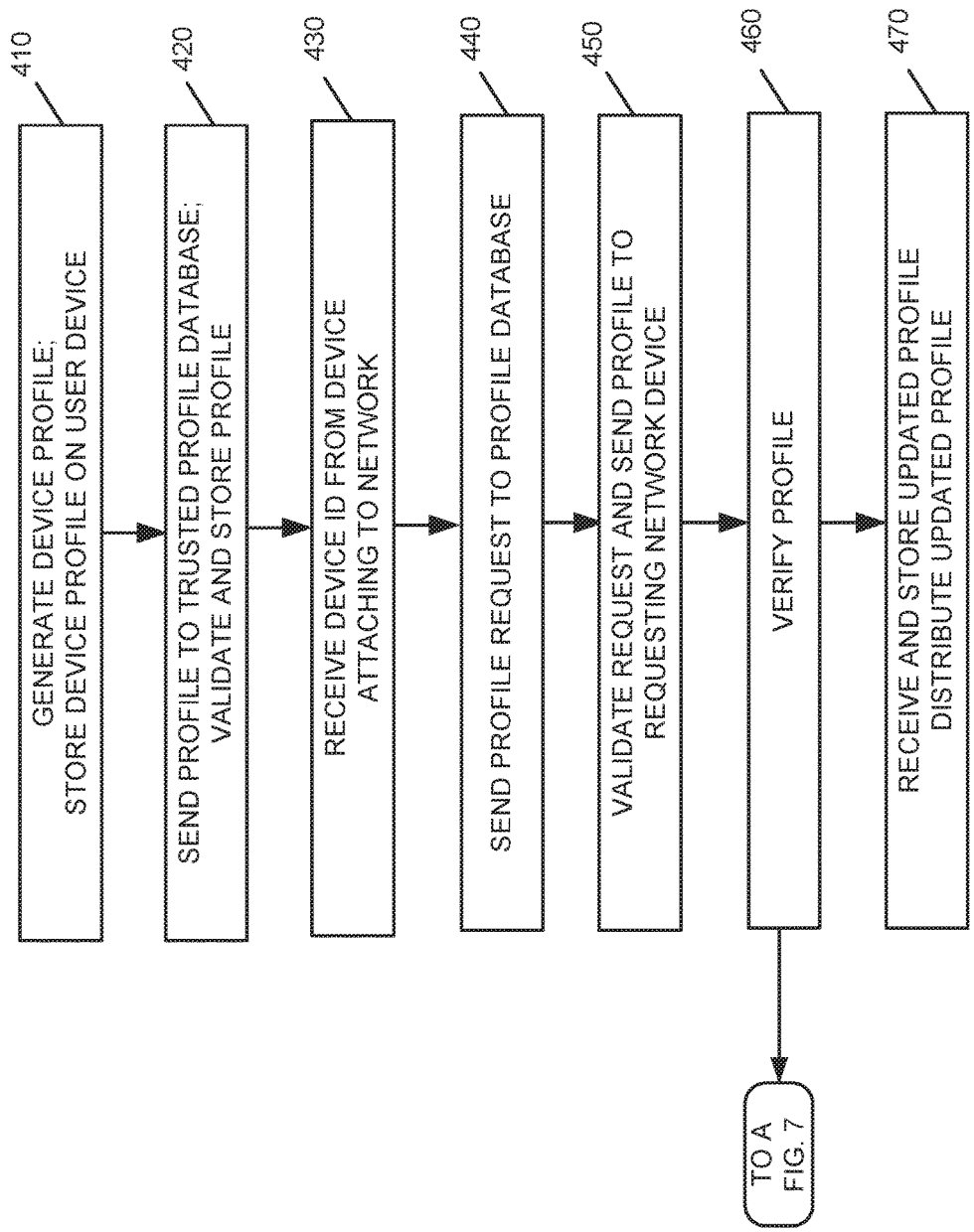
FIG. 4 is a flow diagram illustrating processing by various components illustrated in FIG. 1 in accordance with an exemplary implementation.
Figure 6:
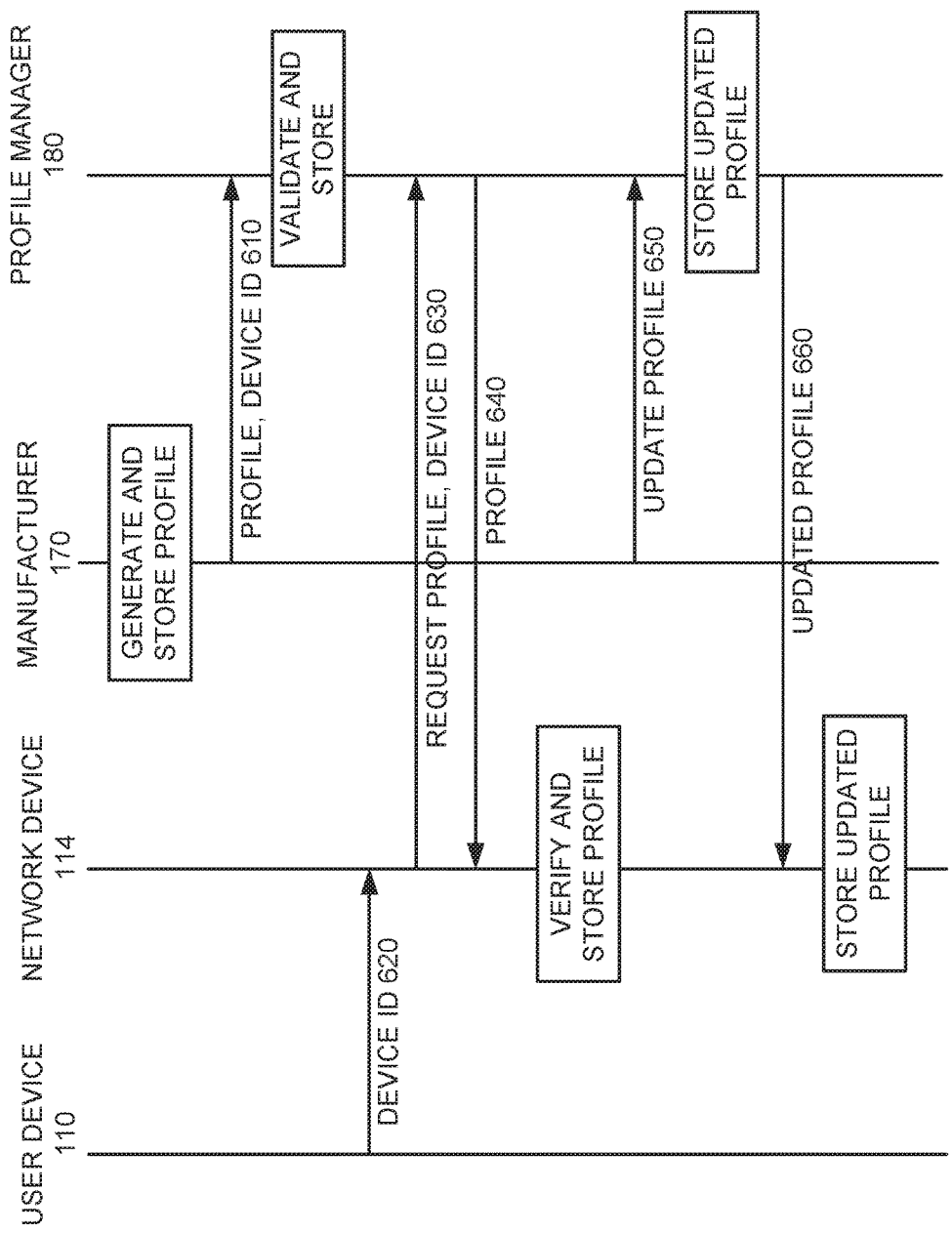
FIG. 6 is an exemplary signal flow diagram associated with the processing of FIG. 4.

FIG. 4 is a flow diagram illustrating processing associated with generating and forwarding a device profile in environment 100, and FIG. 6 is a signal flow diagram associated with the processing in FIG. 4. Processing may begin with generating a device profile for one of user devices 110 (block 410). For example, assume that a new user device 110 is being added to network 112. In one implementation, each user device 110 (and 120) has a device profile created by the manufacturer of the particular device or another entity in environment 100. For example, assume that manufacturer 170 manufacturers various IoT devices, such as cameras that include communication functionality to connect to network 112 to provide security for a home owner, thermostats that can be monitored and controlled remotely via network 112, an OBD device for monitoring a motor vehicle, or some other IoT device or other type of device that includes communication functionality. In such cases, manufacturer 170 may create a device profile for the particular user device 110 that is expected to communicate with other devices in environment 100. The profile for user device 110 may be stored within a file, such as a linked-list file, in binary form. In other instances, the profile may be stored in a human readable form, such as JavaScript Object Notation (JSON) format or extensible markup language (XML) format.

Figure 5:
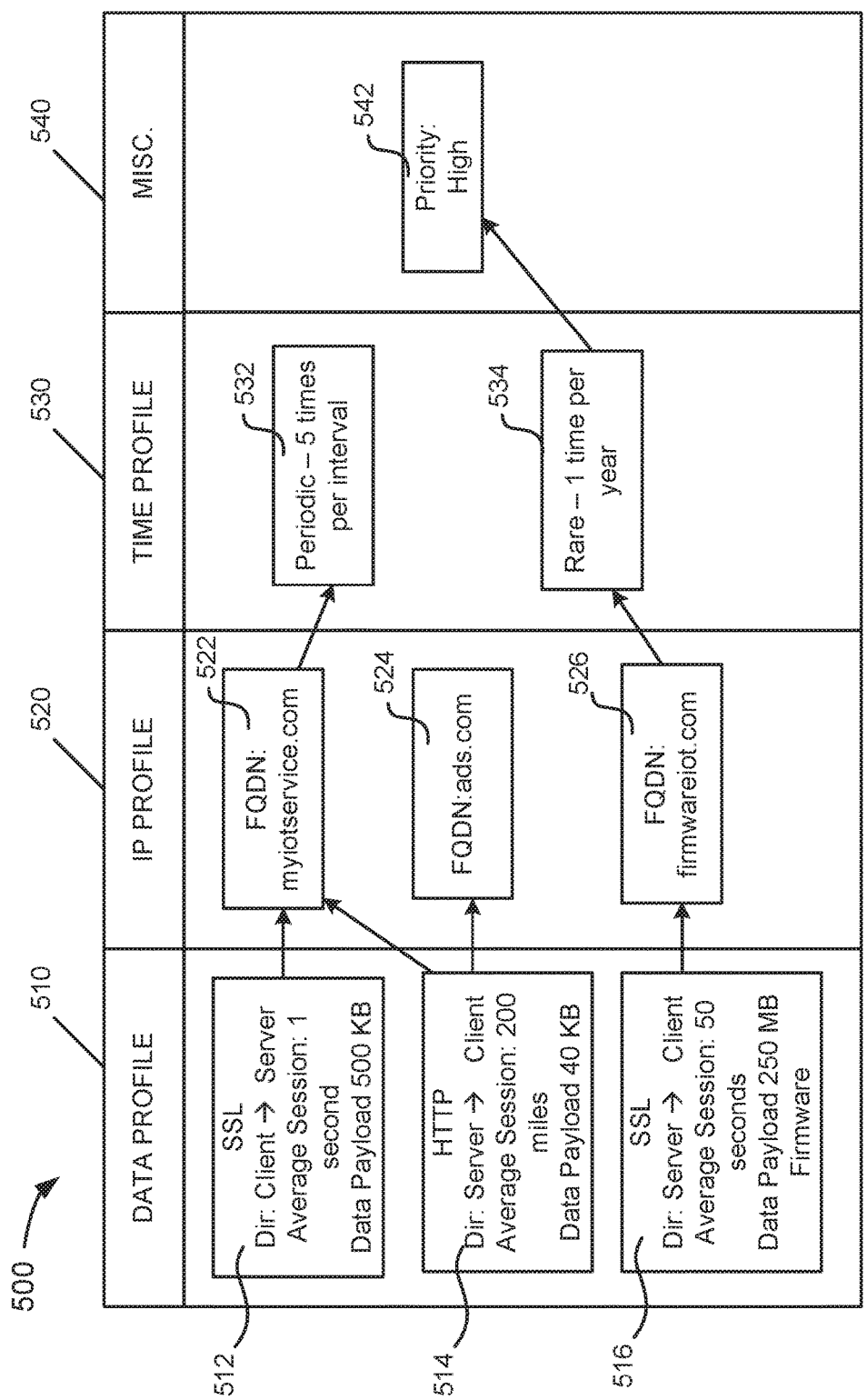
FIG. 5 is an exemplary user device profile stored in one or more of the components of FIG. 1.

FIG. 5 illustrates an exemplary user device profile that may be generated by manufacturer 170. Referring to FIG. 5, user device profile 500 (also referred to herein as device profile 500 or profile 500) includes data profile field 510, IP profile field 520, time profile field 530 and miscellaneous field 540. Device profile 500 effectively maps the profile or behavior expected of one of user devices 110 (e.g., user device 110-1) across multiple network layers (e.g., multiple layers of the seven Open Systems Interconnection (OSI) layers). For example, data profile field 510 maps to the Application layer and IP profile field 520 maps to the IP layer.

Manufacturer 170 may store information in data profile field 510 that describes the expected direction and flow of data/data sessions associated with user device 110, the type of data sessions, the length (in time or distance) of each data session, the amount of data transmitted via each session, as well as other information. Data profile field 510 may store multiple data profiles for each user device 110. For example, data profile field 510 includes data profiles 512, 514 and 516. These data profiles may correspond to the expected data flows to/from user device 110.

Data profile 512 indicates that user device 110 communicates via secure sockets layer (SSL) in a client to server mode (identified by the direction of the arrow from client to server in profile 512) in which user device 110 transmits the data to a server or other network device, the average data session is one second in duration and the average data payload for a data session is 500 Kilobytes (KB) in size. Data profile 514 indicates that user device 110 is also expected to communicate via hypertext transfer protocol (HTTP) in a server to client mode (e.g., user device 110 receives communications from the server as indicated by the arrow from server to client in FIG. 5), an average distance from user device 110 to the server or other network device from which the data is received is 200 miles and the average data payload is 40 KB in size. The distance information may be used to prevent user device 110 from being involved in network attacks against devices located far away from user devices 110. For example, most devices, such as IoT devices are usually configured to transmit information to a system/server that is co-located in a same general geographic area, country, etc., and not to transmit information to a system/server located thousands of miles away from user device 110. Data profile 516 indicates that user device 110 is further expected to communicate via SSL in a server to client mode in which user device 110 receives data, an average data session is 50 seconds in duration and the average data payload from the server to user device 110 for a firmware upgrade is 250 Megabytes (MB) in size.

IP profile field 520 identifies or describes the network locations associated with communications to/from user device 110. For example, IP profile field 520 may include multiple fully qualified domain names (FQDNs) and/or addresses of preferred domain name systems (DNSs) with which user device 110 is expected to communicate. For example, IP profile 522 indicates that user device 110 communicates with the FQDN system/server identified by "myiotservice.com" for data profiles 512 and 514, as indicated by the arrows from data profiles 512 and 514 to IP profile 522 in FIG. 5. IP profile 524 indicates that user device 110 communicates with the FQDN system/server "ads.com" for data profile 514. IP profile 526 indicates that user device 110 communicates with the FQDN system/server "firmwareiot.com" for data profile 516.

Time profile field 530 identifies or describes the frequency and/or "chattiness" of the service/communications. For example, time profile 532 indicates that communications from user device 110 to myiotservice.com may be periodic, such as five times per interval of time. In this case, the interval of time may be one 24 hour period, one week, etc. Time profile 534 may indicate that communications from firmwareiot.com to user device 110 for a firmware upgrade is expected to be rare, such as one time per year. Communications from the FQDN system/server ads.com to user device 110 may not include a corresponding time profile since the advertisements may be sent to user device 110 at various intervals determined by the FQDN system/server ads.com.

Device profile 500 may also include additional characteristics or dimensions associated with data communications/sessions, such as quality of service (QoS) indicators or special time information. For example, miscellaneous profile 542 indicates that the priority for communications from the system/server firmwareiot.com to user device 110 is high.

Profile 500 may be digitally signed by manufacturer 170 to allow various devices in environment 100 to validate that profile 500 is authentic, as described in more detail below. For example, manufacturer 170 may digitally sign profile 500 using a private key associated with manufacturer 170. In some implementations, device profile 500 may be signed with the same SSL certificate used by the particular system/service associated with receiving data from user device 110. However, in an exemplary implementation, profile 500 itself and other profiles 500 (i.e., the information in fields 510-540) does not need to be additionally protected for confidentiality (e.g., encrypted), since profile 500 is intended to be enforced by network elements within environment 100, as described below. That is, adding an extra layer of network security associated with encrypting portions of data profile 500 may not be needed as such security would make it more difficult for various devices to enforce policies in environment 100.

Although FIG. 5 shows exemplary fields of user device profile 500, in other implementations, user device profile 500 may include more or fewer fields containing other information than depicted in FIG. 5. In addition, each user device 110 and 120 may include its own user device profile 500. Still further, in some instances a user device profile 500 for a particular user device 110/120 may include different fields than another user device 110/120, depending on the operating characteristics of the particular user device 110/120.

Referring back to FIG. 4, after manufacturer 170 generates user device profile 500, manufacturer 170 may store or pre-install user device profile 500 on user device 110 (block 410). That is, user device profile 500 may be pre-stored on user device 110 during the manufacturing of user device 110 or prior to the provisioning of user device 110 within environment 100. In other implementations, profile 500 can be downloaded as part of the service that it is configured to perform. For example, if user device 110 is an IoT device, such as a thermostat, and manufacturer 170 or service provider 195 monitors the thermostat in the user's home, manufacturer 170 or service provider 195 may download profile 500 to that particular user device 110 once user device 110 is operational and begins communicating with devices in environment 100. In each case, profile 500 may be stored on user device 110.

To facilitate the distribution of device profile 500 to components in environment 100, as well as facilitate changes to device profile 500 over time, manufacturer 170 sends user device profile 500 along with a unique device identifier (ID) to a trusted profile management server, such as profile manager 180 (block 420; FIG. 6, 610). In accordance with an exemplary implementation, the device ID may be issued with non-repudiation properties to protect the device ID against spoofing. Manufacturer 170 may send the device ID and profile 500 to profile manager 180 via a secure channel. Devices in environment 100, such as network device 114, gateway device 130, etc., may then use the stored profiles to enforce network and device policies, as described in detail below. In addition, sending profile 500 to profile manager 180 may facilitate changes to device profile 500 at a later time. For example, a user device 110 may be configured to transmit data more frequently or less frequently than originally expected, a new FQDN system/server to which user device 110 is expected to communicate may be added, etc. As a result, manufacturer 170 or service provider 195 may need to update device profile 500 over time, as described in more detail below.

Profile manager 180 validates the received user device profile 500 and stores user device profile 500 in a trusted profile database along with the device ID (block 420). For example, profile manager 180 may determine that user device profile 500 was received from a trusted manufacturer 170 before storing user device profile 500. Profile manager 180 may also verify the digital signature associated with profile 500, such as using public key infrastructure (PKI) techniques. For example, profile manager 180 may use a public key associated with manufacturer 170 to determine whether the communication received by profile manager 180 was actually transmitted by manufacturer 170.

Assuming that profile 500 was validated, profile manager 180 may then distribute user device profile 500 to appropriate entities at a later time. For example, assume that user device 110-1 attaches to network 112 and network device 114. As described above, network device 114 may function as a gateway or home router for communications to/from user devices 110. When user device 110-1 attempts to attach to network 112 and network device 114, user device 110-1 may transmit its device ID to network device 114 (FIG. 6, 620).

Network device 112 receives the device ID (block 430). In response to receiving the device ID, network device 114 sends a profile request to profile manager 180 along with the device ID (block 440; FIG. 6, 630). Profile manager 180 validates that the request is from an appropriate entity (e.g., a trusted network device) and transmits the user device profile 500 corresponding to the received device ID to requesting network device 114 (block 450; FIG. 6, 640). Network device 114 receives and verifies or validates the device profile 500 (block 460). For example, network device 114 may determine that profile 500 was received in response to a request from network device 114 and/or use PKI techniques to verify that profile 500 was received from the device from which the information was requested (i.e., profile manager 180 in this example). Network device 114 then store profile 500 in profile database 320 to aid in monitoring the behavior of user device 110 and ensuring that the behavior is in accordance with network policies, as described in detail below.

In other implementations, profile 500 may be distributed within environment 100 in other ways. For example, in one implementation, when user device 110-1 attaches to network 112, user device 110-1 may advertise its profile 500 as part of the procedure/protocol associated with attaching to network 112. For example, user device 110-1 may advertise its profile 500 as part of the Dynamic Host Configuration Protocol (DHCP) or the Address Configuration Protocol (ARP). Network device 114 may receive the advertisement and store the profile included in the advertisement in profile database 320. In addition, network device 114 may return information to user device 110-1 regarding network device 114 and/or network 112, thereby allowing user device 110-1 to establish awareness of the network to which it is attached (e.g., network 112).

In another implementation, profile 500 may be distributed as part of the network attachment procedure to network 112 via inquiry by other network devices. For example, in this implementation, gateway device 114 may send an inquiry to user device 110-1 to provide its profile 500 as part of the physical layer negotiations in accordance with the particular network protocol, such as physical layer negotiations associated with the IEEE 802.1X standard/protocol.

In still another implementation, profile 500 may be distributed to devices in environment 100 in a passive manner. For example, when user device 110-1 contacts the system/ server with which it is configured to communicate (e.g., a destination server or entity monitoring the particular IoT device), user device 110-1 may send its profile 500 as part of a handshaking procedure (e.g., an SSL handshake) that establishes details regarding communications between the IoT device and the monitoring server/entity. Other devices in environment 100 (e.g., network device 114) may intercept or "sniff" the handshaking communication and obtain profile 500 from the handshaking message intended for the destination system/server.

In each case, once network device 114 obtains profile 500, network device 114 may store profile 500 in profile database 320 to monitor and/or enforce user device 110 in environment 100, as described in detail below.

In addition, as described above, device profiles 500 may change over time. For example, a new FQDN identifying a server/system to which an IoT device is expected to communicate may be added by manufacturer 170. In this case, manufacturer 170 may send the updated information identifying the new FQDN along with the device ID to profile manager 180 (FIG. 6, 650). Profile manager 180 may receive the updated profile and store the updated profile in its trusted profile database for that user device 110 identified by the device ID (block 470). Profile manager 180 may also distribute the updated information to the appropriate devices in environment 100, such as network device 114 (block 470; FIG. 6, 660).

In addition, if manufacturer 170 needs to revoke profile 500, manufacturer 170 may send a revocation request to profile manager 180, or profile manager 180 may revoke the profile itself. In such cases, profile manager 180 may store information indicating that profile 500 has been revoked. In some implementations, manufacturer 170 may revoke profile 500 for a user device 110 if that user device 110 is suspected of being involved in a network attack. In each case, profile manager 180 may signal devices in environment 100 that the profile 500 has been revoked and, if appropriate, indicate that user device 110 has been compromised as being part of a network attack. In this manner, devices in environment 100 may continuously and in real time update policies associated with the operations of user devices 110 and 120 in environment 100.

In addition, although the description above refers to network device 114 receiving (and later enforcing device profiles 500), it should be understood that profiles 500 stored by profile manager 180 may be distributed and enforced by any network element in environment 100, such as gateways (e.g., home routers), firewalls (e.g., layer 7 firewalls), peer devices (e.g., other user devices 110/120), etc. Since profile 500 contains information that covers multiple or all OSI layers, any network element may perform some type of action with respect to the user device 110's operating characteristics, thereby further enhancing security within environment 100.

Figure 7:
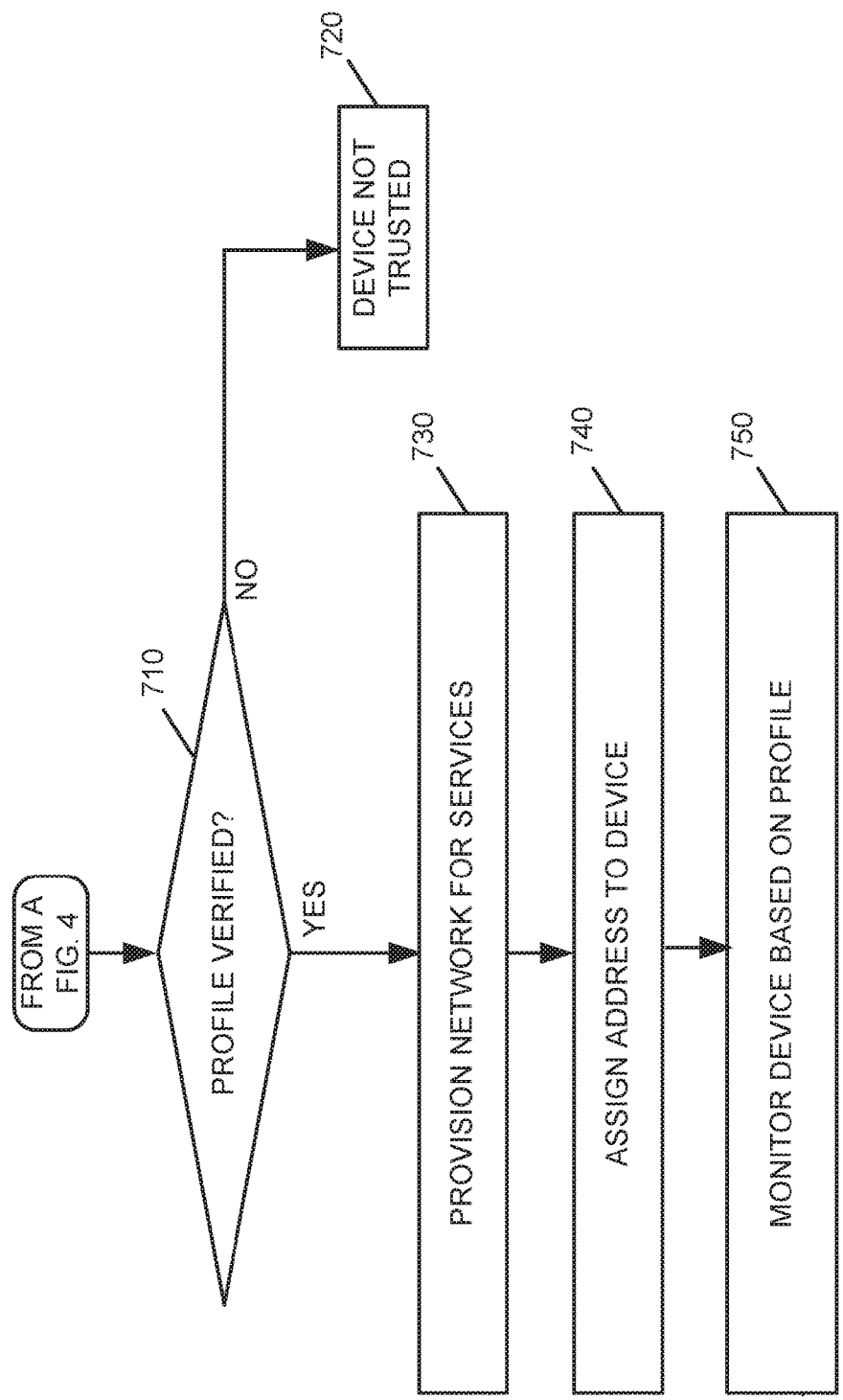
FIG. 7 is a flow diagram associated with profile verification and provisioning network services in accordance with an exemplary implementation.

As described above with respect to FIG. 4, when a user device 110 attaches to a network, such as network 112, network device 114 may retrieve or obtain the user device profile 500 and attempt to verify the profile. FIG. 7 illustrates processing associated with verifying user device profile 500 and provisioning services in environment 100. Processing may begin with determining whether profile 500 is verified (block 710). For example, network device 114 may determine whether user device profile 500 was received in response to a request from network device 114 to profile manager 180. If user device profile 500 was not received in response to such a request, network device 114 may determine that device profile 500 is not verified (block 710—no). In this case, network device 114 may determine that user device 110 is not to be trusted (block 720). For example, network device 114 may prohibit user device 110 from accessing an external network (e.g., network 150 and/or 190).

Alternatively, or additionally, network device 114 may retrieve the public key associated with manufacturer 170 to determine whether the signature associated with the user device profile 500 is authentic. If network device 114 authenticates the signature, network device 114 may determine that the user device profile 500 is verified/authentic (block 710—yes). In response to verifying profile 500, network device 114 may allow user device 110 to communicate with other devices in environment 100 and provision services in network 112 (block 730).

In some implementations, network device 114 may also review a history associated with the particular user device 110 attaching to network 112. For example, profile manager 180 may store history information of user devices 110. As an example, if user device 110-2 was compromised in the past as being part of a network attack, network device 114 may determine that user device 110-2 is not to be trusted and may warrant additional scrutiny before accepting user device 110-2 in network 112. For example, network device 114 may place or assign a user device 110 with a past history of network security issues into a virtual local area network (VLAN) for further monitoring, as described in more detail below. The past history of user devices 110 may be stored in a blockchain format so that any potential networks/network administrators may be able to rely on the past history information as being authentic. For example, if a user takes his/her personal laptop computer to work and wishes to attach to a work network (e.g., network 122), network device 124 may obtain the history of that laptop computer that is stored in profile database 180 or in a series of distributed databases in a blockchain format that includes, for example, a timestamp and link to a previous entry/block. In this manner, network device 114 (or any network device associated with a network to which a user device 110/120 is attempting to connect) may be provided with a blockchain identifying the past history of user devices 110/120 that are secure from tampering and revisions. That is, network devices 114 and 124 may be able to access the complete past history of user devices 110/120 before allowing such devices to be added to networks 112 and 122, respectively.

In some implementations, network device 114 may also reserve bandwidth in accordance with any Quality of Service (QoS) requirements associated with user device 110, service level agreement (SLA) requirements associated with user device 110, etc. For example, network device 114 may be a broadband router configured to provide certain priorities to some devices over other devices in network 112. In such cases, the devices with higher priorities may be given preference with respect to communicating within network 112 and outside network 112.

Network device 114 may also assign an address to user device 110 (block 740). The assigned network address may be used for communications to/from user device 110. Network device 114 may then monitor user device 110's behavior based on the user device profile 500 stored in profile database 320, as described in detail below (block 750).

Figure 8:
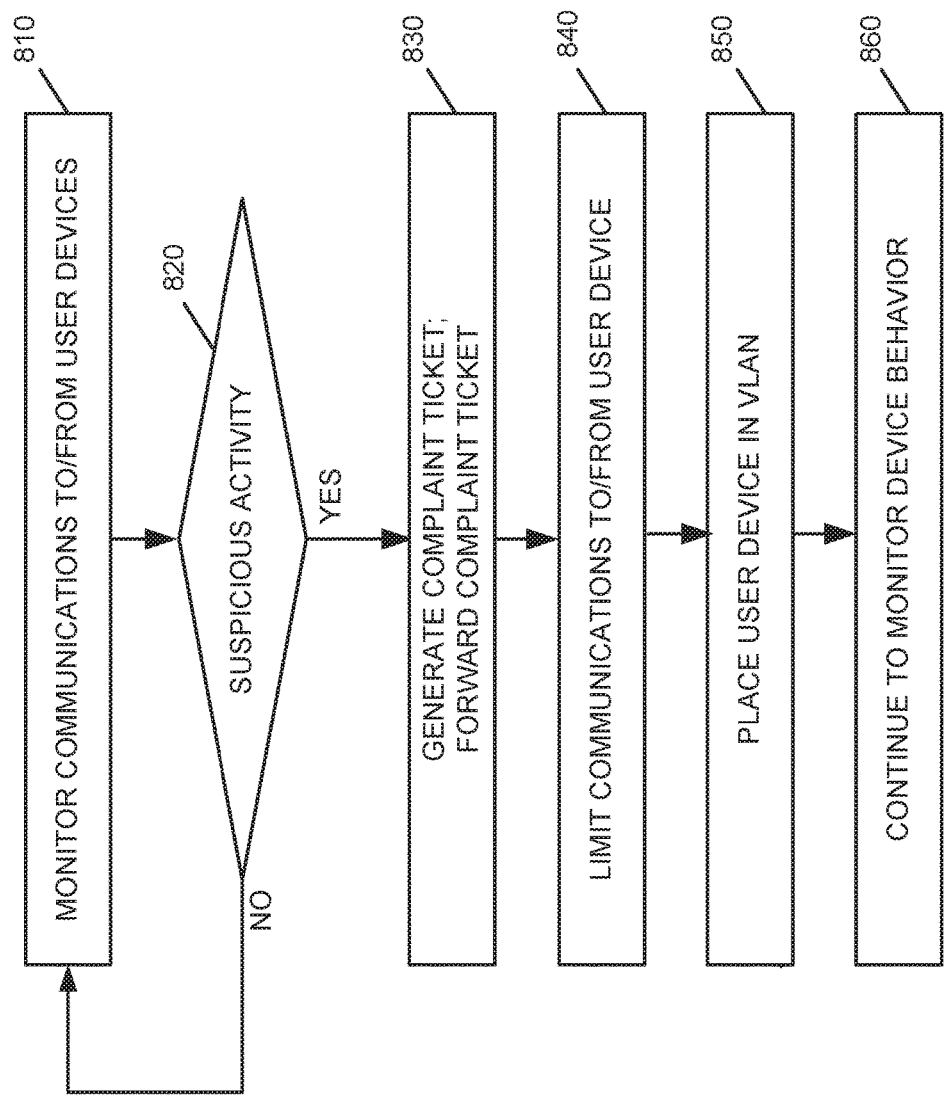
FIG. 8 is a flow diagram illustrating monitoring of device behavior in accordance with an exemplary implementation.

FIG. 8 illustrates exemplary processing associated with monitoring behavior and enforcing policies associated with operation of user devices 110. Processing may begin with network device 114 monitoring communications to/from user devices 110 in network 110 (block 810). For example, behavior monitoring logic 330 may determine whether communications to/from user devices 110 are in accordance with the respective user device profiles 500 associated with each user device 110 stored in profile database 320. Network device 114 may then determine whether any activity with respect to user devices 110 is considered to be suspicious activity (block 820). For example, as described above, user device profile 500 stores data profiles 500 that identify the types, length, payload size, distances, etc., associated with typical communications to/from user devices 110. User device profiles 500 also stores acceptable FQDN hosts/servers with which each user device 110 typically communicates, time profiles for typical communications to/from each user device 110, etc. Behavior monitoring logic 330 may determine whether the communications to/from user devices 110 are in accordance with the stored user device profiles 500.

As an example, assume that user device 110-1 is a camera that is expected to transmit data to security system/server device having the FQDN of "iotservice.com," as illustrated by data profile 512 in FIG. 5. In this case, if behavior monitoring logic 330 determines that user device 110-1 has recently communicated with iotservice.com in a data session in which the data payload was 400 KB in size, network device 114 determines that user device 110-1 is not exhibiting suspicious activity since the communication is in accordance with device profile 500 for user device 110-1 (block 820—no), and continues to monitor user device 110-1's behavior.

If, however, network device 114 determines that user device 110-1 is communicating with an FQDN system/server not included in user device profile 500, such as a server located thousands of miles away from user device 110, has transmitted messages a number of times that is not in accordance with time profile information stored in one of the data profiles (e.g., twenty times or more over a short duration of time, such as one minute), behavior monitoring logic 330 determines that the activity is suspicious (block 820—yes). In this case, network device 114 may generate a "complaint ticket" associated with the suspicious behavior (block 830).

For example, policy enforcement logic 340 may generate a complaint ticket that identifies the suspicious device 110-1 by device ID, Internet protocol address, media access control (MAC) address, etc. In situations in which user device 110-1 is a cellular device (e.g., a smart phone), the complaint ticket may also include an International Mobile Equipment Identify (IMEI), an integrated circuit card identifier (ICCID), or some other unique identifier associated with user device 110-1. The complaint ticket may also include the pattern of the attack, a port number on which the attack was received, and any other pertinent information associated with the attack.

Network device 114 may forward the complaint ticket to one or more other devices in environment 100 (block 830). For example, communication logic 350 may forward the complaint ticket to an ISP or an entity associated with managing an ISP, such as gateway device 130 which may be associated with managing an ISP that provides Internet access to user devices 110 in network 112 or a cellular/mobile network operator that provides for cellular communications to/from user devices 110. In alternative implementations, network device 114 may forward the complaint ticket to other devices in environment 100, such as other ISPs, gateway devices, service providers, peer devices, etc.

Assume that gateway 130 receives the complaint ticket. In accordance with one implementation, gateway 130 may limit communications to/from user device 110 based on the user device profile 500 (block 840). For example, gateway device 130 may block traffic to/from user device 110-1 that is not in accordance with device profile 500.

In addition, other devices in environment 100, such as peer user devices 110 in network 112, a victim server device (e.g., a search engine, a consumer web site, a news cite, a financial institution, etc.) may detect the suspicious behavior based on the number of communications and/or the frequency of communications from a particular user device 110 and report the suspicious behavior to gateway device 130. In such cases, gateway device 130 associated with the ISP may report the potentially compromised device to other ISPs, such as an ISP associated with network 122. In this case, gateway device 130 sends information to gateway device 140 indicating that user device 110-1 may be compromised.

Alternatively, or in addition to gateway 130 limiting communications to/from user device 110-1, in one implementation, network device 114 may place or assign user device 110-1 that is exhibiting suspicious activity into a virtual local area network (VLAN) for further monitoring (block 850). For example, policy enforcement logic 340 may create a VLAN in which potentially compromised devices will be monitored and/or such devices may be restricted from transmitting/receiving communications outside network 112.

For example, policy enforcement logic 340 may block network access to a range of IP addresses or FQDNs. That is, the network routing device located closest to user device 110-1 (e.g., network device 114) may block network access to various IP addresses or FQDNs, such as IP addresses and/or FQDNs that may be the target of the attack. In this manner, network device 114 located closest to the offending/suspicious device may effectively limit communications to/from user device 110-1.

As an example, if an IP-enabled camera 110-1's profile dictates that it should be expected to connect to only its home server identified by "myiotservice.com," policy enforcement logic 340 may enforce that restriction through the VLAN. If network device 114 determines that user device 110 is attempting a transmission control protocol (TCP) connection to another FQDN, policy enforcement logic 340 blocks that connection request and optionally alerts an administrator associated with network 112 and/or an ISP associated with providing Internet access for network 112. In this manner, network device 114 may help stop botnet attacks in a very effective manner because IoT devices cannot be "hijacked" to attack targets. In contrast, typical defenses to DDoS attacks that use botnets rely on blocking traffic at the end nodes/destinations, which may not be successful since if enough traffic gets to the end node, the destination system/device that is targeted in the attack may still be adversely impacted (e.g., be taken down/offline). By limiting communications at the source, such attacks may be effectively stopped. In addition, distributing and enforcing policies in environment 100 via network devices located closest to suspicious devices limits network attack related communications and provides distributed counter measures to such attacks.

Network device 114 may then continue to monitor device behavior and perform various actions (block 860). For example, network device 114 may place suspicious network devices into a VLAN and block communications in accordance with the respective user devices profiles 500.

In addition, when a user device 110 is operating in a suspicious manner, network device 114 and/or an ISP providing network access may communicate with manufacturer 170 of the suspicious user device 110. In this manner, manufacturer 170 may become aware of user devices 110 that may be compromised. This may allow manufacturer 170 to more quickly investigate potential vulnerabilities in user devices 110 that it manufactures/deploys in environment 100. Manufacturer 170 may then download fixes to the vulnerabilities, such as software patches, to allow the device behavior and/or susceptibility to attacks to be corrected. In some instances, manufacturer 170 may download a link, such as a uniform resource locator (URL) to allow a network administrator to attempt to diagnose the problem.

Still further, implementations described herein provide for privacy/confidentially within environment 100. For example, a gateway device (e.g., network device 114) can enforce profiles/policies to ensure that IoT devices are not leaking data to other network destination. For example, network device 114 can ensure that a user device 110 configured to communicate with only a single entity (e.g., an OBD device configured to communicate with a vehicle monitoring service, an Amazon Echo device configured to communicate only with a specific Amazon server), only connects to that specific server/entity. Device profile 500 can also be used to enforce quality of service (QoS) since profiles 500 include information about the typical bandwidths and data sizes of the session. That is, network device 114 can ensure that communications associated with a particular QoS, SLA, etc., are performed in accordance with the predetermined requirements.

Implementations described herein provide for monitoring and policing networks in a distributed manner. User devices 110/120 may be monitored for compliance with fingerprints or profiles that may be dynamically distributed to various devices for monitoring, policing and network protection purposes. The profiles may also be dynamically modified in accordance with changing network requirements. In this manner, device behavior may be monitored in real time in accordance with up-to-date device profiles. In addition, network devices may effectively "quarantine" suspicious devices, such as placing such devices in a VLAN and continuing to monitor such devices in the VLAN, by limiting communications to/from the suspicious devices. This may allow networks to effectively thwart attacks, such as DDoS attacks at their sources.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to limiting communications to/from a suspicious user device in accordance with device profiles. In other implementations, all communications to/from a suspicious device 110/120 may be blocked until a network administrator investigates the particular suspicious activity and clears the user device to resume sending/receiving communications.

In addition, as described above, device profiles 500 may be stored for each device operating in environment 100. In some implementations, the device profiles 500 may also be used by networks/network administrators to aid in dynamically configuring networks, such as networks 112 and 122. For example, a network device 114 may use profiles 500 to dynamically and automatically (e.g., without manual intervention by a network administrator) establish a most efficient configuration based on the device profiles 500. As an example, if network device 114 accesses user device profiles 500 and determines that one of user devices 110 is an IoT streaming camera that communicates with a system/server to monitor home security, network device 114 may automatically configure the network to enforce QoS policies to ensure that the streaming camera will have adequate bandwidth to stream its data. As another example, if network device 114 determines that a particular user device's profile 500 indicates that particular user device 110 frequently downloads large amounts of data, such as a television connected to a home network, network device 114 may place that device within its own VLAN, with dedicated bandwidth. Providing the dedicated bandwidth may help avoid having other devices, such as gaming devices, music streaming devices, etc., use too much bandwidth that adversely impacts the user device 110 being able to download large amounts of data. In this manner, device profiles 500 may be used to aid in automatically self-configuring networks.

Further, while series of acts have been described with respect to FIGS. 4, 7 and 8 and signal flows with respect to FIG. 6, the order of the acts and/or signal flows may be different in other implementations. Moreover, non-dependent acts may be implemented in parallel.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
monitoring, by a first network device, communications from a first user device coupled to a network;
sending, by the first network device and to a profile management device that is separate from the first network device, a request for a profile associated with the first user device, wherein the request includes a device identifier associated with the first user device;
receiving, from the profile management device, the profile associated with the first user device;
storing, by the first network device, the profile for the first user device;
determining, by the first network device and based on the communications, whether the first user device is operating in accordance with the profile associated with the first user device;
transmitting, by the first network device, a message to a second network device in response to determining that the first user device is not operating in accordance with the profile; and
blocking, by the first network device or the second network device, at least some communications from being transmitted to or received by the first user device, in response to determining that the first user device is not operating in accordance with the profile,
wherein the first network device comprises a routing device coupled to the network, and wherein the determining comprises:
determining, by the routing device, whether the first user device is communicating with at least one device not identified in the profile associated with the first user device, and
wherein the blocking comprises:
blocking, when the first user device is communicating with at least one device not identified in the profile associated with the first user device, additional communications from the first user device from being transmitted outside the network.

2. The method of claim 1, further comprising:
assigning the first user device to a virtual local area network (VLAN) in response to determining that the first user device is not operating in accordance with the profile;
continuing to monitor, by the first network device, communications from the first user device after the first user device is assigned to the VLAN; and
enforcing, by the first network device and after the first user device is assigned to the VLAN, communications to and from the first user device in accordance with the profile.

3. The method of claim 1, wherein the blocking further comprises:
blocking, by the second network device, the at least some communications from being transmitted to or received by the first user device, wherein the second network device is associated with an Internet service provider providing Internet service to the first user device.

4. The method of claim 1, further comprising:
generating, by a second user device coupled to the network, a second message in response to determining that the first user device is potentially operating as part of a network attack; and
transmitting, by the second user device, the second message to a least one of the first network device or the second network device,
wherein the second user device is a target of the network attack and wherein the second message comprises an address of the first user device and information associated with a type of network attack.

5. The method of claim 1, wherein the stored profile identifies at least one device or an address of at least one device with which the first user device is permitted to communicate, an average payload size of communications to or from the first user device and a frequency of communications at least one of to or from the first user device.

6. The method of claim 1, further comprising:
transmitting, by the second network device, a second message to an entity associated with manufacturing or monitoring the first user device,
wherein the second network device is associated with an Internet service provider providing Internet service to the first user device and the second message indicates that the first user device is operating in a suspicious manner with respect to a network attack.

7. The method of claim 1, further comprising:
storing, in the profile for the first user device, information indicating that the first user device was compromised with respect to a network attack; and
providing the information indicating that the first user device was compromised to an other entity, wherein the other entity is a second routing device associated with an other network to which the first user device is attempting to connect.

8. The method of claim 1, further comprising:
providing, by the first user device, the profile as part of an attachment procedure for attaching to the network.

9. The method of claim 1, further comprising:
intercepting, by the first network device, a communication from the first user device intended for a third network device associated with monitoring the first user device; and
identifying, based on the intercepted communication, the profile for the first user device.

10. The method of claim 1, wherein the first user device comprises an Internet of Things (IoT) device, and the first network device is configured to forward communications from the IoT device via the Internet.

11. A system, comprising:
a memory; and
at least one device configured to:
monitor communications from a first user device coupled to a network,
send, to a profile management device configured to store profiles for devices coupled to the network and that is separate from the at least one device, a request for the profile associated with the first user device, wherein the request includes a device identifier associated with the first user device,
receive, from the profile management device, the profile associated with the first user device,
store, in the memory, the profile associated with the first user device,
determine, based on the communications, whether the first user device is operating in accordance with the profile associated with the first user device,
transmit a message to a second network device in response to determining that the first user device is not operating in accordance with the profile, and block at least some communications from being transmitted to or received by the first user device, in response to determining that the first user device is not operating in accordance with the profile, wherein the at least one device comprises a routing device coupled to the network, and wherein when determining, the routing device is configured to:

determine whether the first user device is communicating with at least a second device not identified in the profile associated with the first user device, and when blocking at least some communications, the at least one device is configured to:

block, when the first user device is communicating with at least the second device not identified in the profile associated with the first user device, additional communications from the first user device from being transmitted outside the network.

12. The system of claim 11, wherein the at least one device is further configured to:

assign the first user device to a virtual local area network (VLAN) in response to determining that the first user device is not operating in accordance with the profile, continue to monitor communications from the first user device after the first user device is assigned to the VLAN, and enforce communications to and from the first user device in accordance with the profile.

13. The system of claim 11, wherein the at least one device is configured to:

generate a second message in response to determining that the first user device is potentially operating as part of a network attack, and transmit the second message to a least one other device, wherein the second message comprises an address of the first user device and information associated with a type of network attack.

14. The system of claim 11, wherein the at least one device is further configured to:

transmit a second message to an entity associated with manufacturing or monitoring the first user device, wherein the second message indicates that the first user device is operating in a suspicious manner with respect to a network attack.

15. The system of claim 11, wherein the at least one device is further configured to:

store, in the profile for the first user device, information indicating that the first user device was compromised with respect to a network attack; and provide the information indicating that the first user device was compromised to an other entity, wherein the other entity is a routing device associated with an other network to which the first user device is attempting to connect.

16. The system of claim 11, wherein the stored profile identifies at least one third device or an address of at least one third device with which the first user device is permitted to communicate, an average payload size of communications to or from the first user device, and a frequency of communications at least one of or from the first user device.

17. A non-transitory computer-readable medium having stored thereon sequences of instructions which, when executed by at least one processor included in a routing device coupled to a network, cause the at least one processor to:

monitor communications from a first user device coupled to a network;

send, to a profile management device that is separate from a device in which the at least one processor is executing, a request for a profile associated with the first user device, wherein the request includes a device identifier associated with the first user device;

receive, from the profile management device, the profile associated with the first user device;

store, by the first network device, the profile for the first user device;

determine, based on the communications, whether the first user device is operating in accordance with the profile associated with the first user device;

transmit a message to a network device in response to determining that the first user device is not operating in accordance with the profile; and block at least some communications from being transmitted to or received by the first user device, in response to determining that the first user device is not operating in accordance with the profile, wherein when determining, the instructions cause the at least one processor to:

determine whether the first user device is communicating with at least one device not identified in the profile associated with the first user device, and when blocking at least some communications, the instructions cause the at least one processor to:

block, when the first user device is communicating with at least one device not identified in the profile associated with the first user device, additional communications from the first user device from being transmitted outside the network.

18. The non-transitory computer-readable medium of 17, wherein the instructions further cause the at least one processor to:

assign the first user device to a virtual local area network (VLAN) in response to determining that the first user device is not operating in accordance with the profile;

continue to monitor communications from the first user device after the first user device is assigned to the VLAN; and enforce communications to and from the first user device in accordance with the profile.

19. The non-transitory computer-readable medium of 17, wherein the instructions further cause the at least one processor to:

generate a second message in response to determining that the first user device is potentially operating as part of a network attack; and transmit the second message to a least one other device, wherein the second message comprises an address of the first user device and information associated with a type of network attack.

20. The non-transitory computer-readable medium of 17, wherein the instructions further cause the at least one processor to:

store, in the profile for the first user device, information indicating that the first user device was compromised with respect to a network attack; and provide the information indicating that the first user device was compromised to an other entity, wherein the other entity is a second routing device associated with an other network to which the first user device is attempting to connect.

* * * * *